March 18, 1969    N. O. KEARNS ET AL    3,433,520

SPRING BIASED SHOCK ABSORBING BUMPER

Filed Oct. 11, 1967

INVENTORS
Norvan O. Kearns
Rolland J. Steinmetz

BY Schmidt, Johnson, Hovey,
Williams & Bradley
ATTORNEYS

United States Patent Office 3,433,520
Patented Mar. 18, 1969

3,433,520
SPRING BIASED SHOCK ABSORBING BUMPER
Norvan O. Kearns, 8349 Locust, Kansas City, Mo. 64131, and Rolland J. Steinmetz, Rte. 2, Box 38, Slater, Mo. 65349
Filed Oct. 11, 1967, Ser. No. 674,511
U.S. Cl. 293—85    3 Claims
Int. Cl. B60r 19/06, 21/14; B61f 19/04

ABSTRACT OF THE DISCLOSURE

Resilient mounts for an automobile bumper comprising a tubular housing closed at one end and mounted directly on the automobile frame. A coil spring is received in the tubular housing and extends to the bumper. A U-shaped guide member is mounted on the side of the housing opposite the frame and has an elongated rod secured to the bumper and shiftably received through aligned apertures in each of the projecting legs of the guide member with the longitudinal axis of the rod disposed in parallelism with the longitudinal axis of the spring. A pin carried by the rod and engageable with one leg of the member holds the spring in a partially compressed condition and a shear pin on the rod limits relative shifting of the rod in the opposite direction to a predetermined distance until a force of predetermined magnitude is applied to the bumper.

---

This invention relates to automobiles and, more particularly, to a resilient mounting for attachment of a bumper to an automobile frame.

The increasing number of automobile accidents, together with the severity of injuries which result therefrom, has placed substantial emphasis on the provision of structure designed for safer operation. Further, the relatively high cost of body and frame repairs resulting from automobile collisions indicates that means should be provided for minimizing the extent of such damage, especially when the force of a collision is of a magnitude which can be absorbed by shock-cushioning means without resulting in structural damage.

Various proposals have heretofore been submitted for mounting a bumper on an automobile in a manner wherein the mounting means is yieldable for absorbing all or a portion of the forces which may be applied against the bumper. These have even included a variety of proposals for utilizing coil springs or the like interposed between the frame or body of the automobile and the bumper itself. None of these proposals, however, have met with widespread acceptance primarily because of various deficiencies inherent in the construction of the devices which have heretofore been proposed. Specifically, many of the springs have been mounted in concentric relationship around a guide rod or shaft, thereby requiring auxiliary structure for maintaining proper alignment of the guide rod interposed intermediate the ends of the springs which necessarily limit the extent to which the spring can yield upon impact. Other attempts have included relatively slidable cylinders enclosing the springs. Such cylinders require care and servicing to maintain the slidable relationship. Further, the rigidity against lateral displacement (such as is required to permit jacking of the automobile at the bumper) is quite limited in devices of this type.

One further very important disadvantage in mountings heretofore attempted, has resided in the fact that they are subject to considerable vibration and consequent rattle because of the yieldable nature of the structure involved. Attempts have been made to provide structure for maintaining the springs in a partially compressed state so that force of the springs resist these vibrations. One such attempt involves use of a chain secured at one end to the mounting structure carried by the vehicle frame and at the other end to the bumper. Manifestly, the chain may hold the spring in a precompressed state and it exerts no compression against the bumper to prevent yielding thereof upon impact. However, in like manner, a relatively flexible element such as a chain or the like provides no support against lateral displacement of the bumper as mentioned above.

An additional disadvantage with earlier attempts to provide resilient bumper mounting means resides in the fact that they have been generally devoid of means which would permit forces of magnitudes below that of a predetermined magnitude to be applied to the bumper without permitting the bumper to substantially compress the springs. Accordingly, it has been difficult or virtually impossible to utilize automobiles equipped with such resiliently mounted bumpers for pushing other automobiles or the like.

It is, therefore, the primary object of this invention to provide novel automobile bumper mounting structure which is resilient for cushioning shocks applied to the bumper and yet which is provided with guide rod means for resisting any lateral movement of the bumper.

It is another important object of the invention to provide such resilient mounting structure which may be quickly and easily installed on existing automobiles or on newly manufactured automobiles, and which is attached directly to the automobile frame without the necessity for intervening arms, levers or the like, thereby increasing the rigidity of the unit.

It is another important object of the invention to provide such resilient mounting structure for an automobile bumper wherein the guide rod also serves for maintaining the spring in a partially compressed state to avoid vibrations, and yet which does not interfere with compression of the spring throughout its entire range when force is applied to the bumper for shifting the latter toward the automobile frame.

It is still a further object of this invention to provide mounting structure equipped with novel shear pin means to permit relatively unyielding use of the bumper when the forces applied to the bumper are below that of a predetermined magnitude, and yet which will readily fail to permit yielding of the bumper when the forces applied thereto exceed said predetermined magnitude.

These and other important objects of the invention will be further explained or will become apparent from the following description, claims and drawing.

Figure 1:
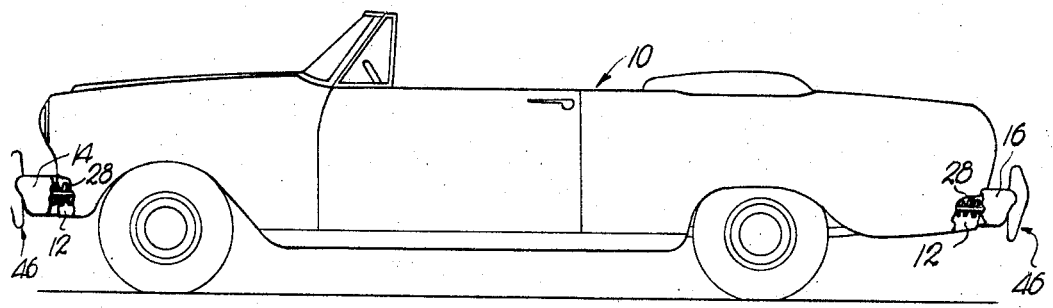
FIG. 1 is a side elevational view of an automobile equipped with the bumper mountings of this invention, parts being broken away to reveal details of construction.
Figure 2:
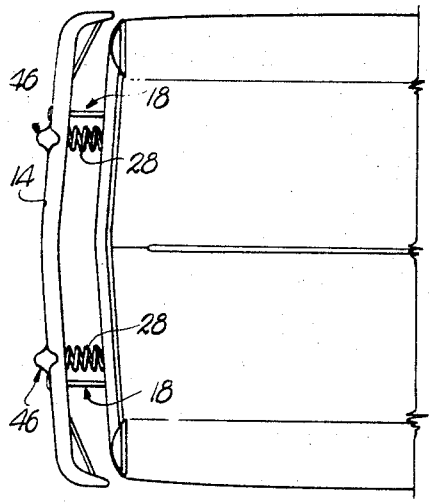
FIG. 2 is an enlarged, fragmentary, top plan view of the automobile of FIG. 1 showing the front end portion thereof.
Figure 3:
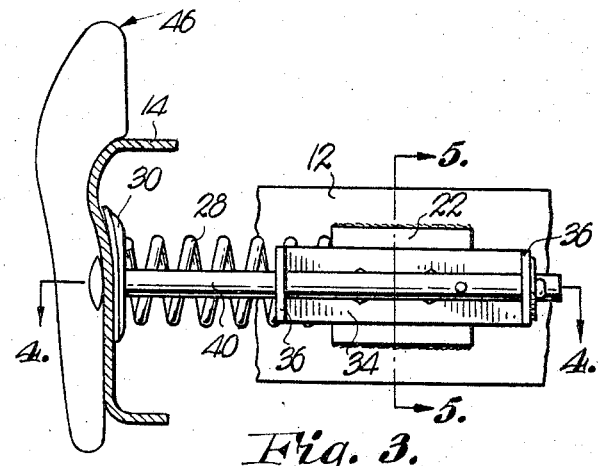
FIG. 3 is a still further enlarged, fragmentary, vertical, cross-sectional view through the automobile bumper illustrating one of the mounting structures in elevation.

An automobile equipped with the resilient bumper mounting structure of this invention is designated by the numeral 10 and includes the usual fore-and-aft extending frame members 12 with transversely extending bumpers 14 and 16 disposed in spaced relationship from the opposed ends of frame members 12. The resilient bumper mounts 18 are interposed between bumpers 14 and 16 and the respective frame members 12 to permit shifting of the bumpers toward and away from the ends of the frame members as will be hereinafter described. It is contemplated that a pair of mounts 18 will be provided for each bumper as illustrated particularly in FIG. 2.

Figure 5:
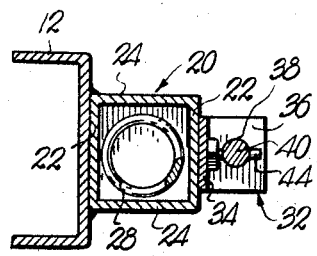
FIG. 5 is a vertical, cross-sectional view taken along line 5—5 of FIG. 3.

Mount 18 includes an elongated, transversely polygonal, tubular housing 20 having opposed side walls 22 and 24 as illustrated best in FIG. 5. The end of housing 20 remote from bumper 14 is closed by an end wall 26. The side walls 22 and 24 are planar and one side wall 22 lies flat against the outer surface of frame member 12 and is rigidly secured to the latter as by welding or the like. Manifestly, if desired, the side wall 22 adjacent frame member 12, could be omitted, whereupon the ends of the side walls 24 could be welded directly to frame member 12.

Figure 4:
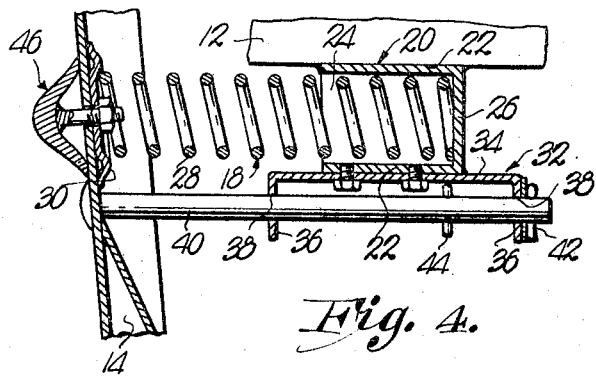
FIG. 4 is a horizontal, cross-sectional view taken along line 4—4 of FIG. 3.

One end of a coil spring 28 is received within housing 20 and bears against end wall 26 of the latter. Spring 28 projects outwardly from housing 20 and is attached by a retainer 30 or the like to the innermost surface of bumper 14 as illustrated best in FIG. 4. An elongated, U-shaped guide member 32, having a bight portion 34 secured to the side wall 22 of housing 20 remote from frame member 12, is provided with outwardly projecting legs 36. Each leg 36 has an aperture 38 therethrough for slidably receiving an elongated, transversely circular guide rod 40 disposed in parallel relationship to the longitudinal axis of spring 28 and housing 20. The outermost end of rod 40 is rigidly secured to bumper 14.

A pin 42 extending transversely through rod 40 adjacent leg 36 of member 32 remote from bumper 14 holds the latter inwardly toward the proximal end of frame member 12 for maintaining spring 28 in a partially compressed condition, and a spring 28 serves to hold bumper 14 in outwardly spaced relationship from the end of the frame member 12. A shear pin 44 which may be located between the projecting legs 36 is spaced a predetermined distance from one of the legs 36 to permit limited shifting of rod 40 before pin 44 comes into engagement with the proximal leg 36. However, when bumper 14 is shifted a predetermined distance toward the automobile frame, pin 44 moves into engagement with the proximal leg 36 and resists further shifting movement of the rod. Manifestly, upon the application of a force greater than that of a predetermined magnitude to bumper 14 and, therefore, to rod 40, pin 44 will fail to permit further shifting of rod 40.

It is to be pointed out that the bumper guards 46 utilized with bumper 14 are substantially longer than those installed on conventional bumpers. This ensures that the forces resulting from a collision between automobile 10 and other automobiles will be transmitted to bumper 14 irrespective of whether or not the bumpers of the two automobiles would otherwise coincide upon impact.

It is contemplated that each of the resilient mounts 18 may be identical and that the mounting of rear bumper 16 may be carried out in like manner to that described with respect to front bumper 14. Further, the bumper guards 46 carried by rear bumper 16 are also of greater length than conventional.

When forces are applied to the automobiles bumpers, the corresponding springs yield to permit shifting of the rods 40 and movement of the bumper toward the vehicle frame. Guide rods 40 ensure that the movement of the bumper proceeds along a direction which compresses the spring on its longitudinal axis. If the force against the bumper does not exceed a predetermined magnitude, the force is transmitted through shear pin 44 as the latter engages the proximal leg 36, through member 32 and housing 20 directly to the vehicle frame. Thus, for such low magnitude impacts as would be occasioned by an attempt to push another vehicle with automobile 10, or by minor collisions which would not otherwise damage the vehicle, mount 18 reaches a position where the components are no longer yieldable after a predetermined initial shifting of the relative components. However, should the force exceed this predetermined magnitude as would be occasioned by a major collision, shear pin 44 fails to permit continued yielding of the components and the compressing of spring 28 to cushion the shock. It is contemplated that spring 28 will be of sufficient magnitude that all but the most severe shocks can be cushioned thereby without resulting in damage to the vehicle. Even in extremely serious collisions which continue beyond the capacity of the springs 28 for resisting the forces generated thereby, such initial yielding of the springs 28 as does occur, tends to minimize the resultant damage and to lessen the possibility of injury to the passengers in the automobile.

It is to be pointed out that guide rod 40 prevents any lateral movement of the vehicle bumper in a direction other than on a straight line toward and away from the frame members. Accordingly, a vehicle equipped with the resilient mounts herein described can readily be lifted by means of a bumper jack or the like without damage to the springs and without requiring specialized equipment. The location of the guide rods in spaced relationship from the springs ensures that there are no obstructions to be engaged by the spring upon impact which would tend to retard or lessen the compressing of the spring.

Manifestly, should it be desired to increase the resistance to movement of the bumpers 14 and 16, springs 28 having increased restoring force may be chosen. Further, it is apparent that additional coil springs similar to springs 28 but of smaller diameter, could be mounted within the latter and in concentric relationship therewith to increase the effective spring force.

Additionally, those skilled in the art will recognize that covers (not shown) of any suitable material such as plastic or the like, might be provided in covering relationship around the mounts 18 to prevent ingress of dirt, water, etc. to thereby ensure free operation of the moving parts at all times.

Having thus described the invention, what is claimed as new and desired to be secured by Letters Patent is:

1. In an automobile provide with a frame and a transversely extending bumper disposed in spaced relationship from the end of said frame, a pair of spaced, resilient mounts for said bumper, each mount comprising:
   a tubular housing having a side wall and an end wall closing one end of said housing;
   means rigidly mounting said housing directly to said frame with the open end of said housing facing the bumper;
   an elongated, rigid, U-shaped guide member, said guide member including a bight portion and a pair of spaced legs, the bight portion being secured to the side wall of said housing on the side thereof opposite from said frame with the legs and the member projecting outwardly from said housing, each leg having an aperture therethrough, said apertures being aligned on an axis extending generally parallel with the longitudinal axis of said housing;
   an elongated compression coil spring having one end received within the housing, said spring projecting outwardly therefrom toward the bumper, the other end of said spring being disposed to engage said bumper;
   an elongated rod having one end thereof secured to the bumper, the rod extending in shiftable relationship through said aligned apertures in the legs of said guide member with the longitudinal axis of the rod being disposed in parallelism with the longitudinal axis of said spring; and
   abutment means carried by the rod and engageable with one of the legs of said guide member on the side thereof opposite the direction of thrust of said spring to limit movement of the guide member in the direction away from said end of the frame, whereby the spring may be held in a partially compressed state between the end wall of the housing and said bumper.

2. The invention of claim 1, and a shear pin carried by the rod in disposition to engage one of the legs of said guide member upon the shifting of the rod a predetermined distance in the direction toward said end of the frame, said shear pin being subject to failure to permit shifting of the rod a distance greater than said predetermined distance upon the application of a force against the bumper in the direction of the frame and in excess of a predetermined magnitude.

3. The invention of claim 2, wherein said housing is transversely polygonal in transverse cross section, said side wall including at least two planar sections, one of said sections being disposed against the frame, the guide member being mounted on another of said planar sections.

References Cited

UNITED STATES PATENTS

| Re. 16,020 | 3/1925 | Schwartz | 293—85 |
| 1,503,049 | 7/1924 | Jezek | 293—85 |
| 1,618,394 | 2/1927 | Voyatzis | 293—85 |
| 2,837,176 | 6/1958 | Dropkin | 293—85 |
| 3,097,725 | 7/1963 | Peterson | 293—86 XR |

ARTHUR L. LA POINT, *Primary Examiner.*

H. BELTRAN, *Assistant Examiner.*

U.S. Cl. X.R.

293—89, 101